United States Patent
Shen et al.

(10) Patent No.: US 10,565,791 B2
(45) Date of Patent: Feb. 18, 2020

(54) TRACKING RIGGED POLYGON-MESH MODELS OF ARTICULATED OBJECTS

(71) Applicant: Microsoft Technology Licensing, LLC, Redmond, WA (US)

(72) Inventors: Jingjing Shen, Cambridge (GB); Thomas Joseph Cashman, Cambridge (GB); Timothy James Hutton, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 52 days.

(21) Appl. No.: 15/905,740

(22) Filed: Feb. 26, 2018

(65) Prior Publication Data

US 2018/0182166 A1 Jun. 28, 2018

Related U.S. Application Data

(63) Continuation-in-part of application No. 14/982,878, filed on Dec. 29, 2015, now Pat. No. 10,186,081.

(51) Int. Cl.
*G06T 17/20* (2006.01)
*G06T 7/73* (2017.01)

(52) U.S. Cl.
CPC .............. *G06T 17/205* (2013.01); *G06T 7/75* (2017.01); *G06T 2207/10028* (2013.01); *G06T 2215/16* (2013.01)

(58) Field of Classification Search
CPC .......... G06T 17/205; G06T 7/75; G06T 7/251
See application file for complete search history.

(56) References Cited

U.S. PATENT DOCUMENTS

| | | | |
|---|---|---|---|
| 5,454,043 | A | 9/1995 | Freeman |
| 6,128,003 | A | 10/2000 | Smith et al. |
| 6,788,809 | B1 | 9/2004 | Grzeszczuk et al. |
| 7,702,130 | B2 | 4/2010 | Im et al. |
| 8,154,524 | B2 | 4/2012 | Wilson et al. |
| 8,351,646 | B2 | 1/2013 | Fujimura et al. |
| 8,428,311 | B2 | 4/2013 | Dariush et al. |
| 8,576,253 | B2 | 11/2013 | Wilson |
| 8,610,723 | B2 | 12/2013 | Lee et al. |
| 8,682,028 | B2 | 3/2014 | Geiss |
| 8,717,318 | B2 | 5/2014 | Anderson et al. |
| 8,718,327 | B2 | 5/2014 | Tong et al. |
| 8,774,464 | B2 | 7/2014 | Adhikari |

(Continued)

OTHER PUBLICATIONS

"Leap Motion for Mac and PC", Available at: https://www.leapmotion.com/, Oct. 8, 2015, 5 Pages.

(Continued)

*Primary Examiner* — Kim Y Vu
*Assistant Examiner* — Molly Delaney (57) ABSTRACT

A tracker is described which comprises a processor configured to receive captured sensor data depicting an object. The processor is configured to access a rigged polygon mesh model of the object and to compute a plurality of approximate surface normals of a limit surface of the rigged polygon mesh. The processor is configured to compute values of pose parameters of the model by calculating an optimization to fit the model to the captured sensor data where the optimization uses an evaluation function based on the plurality of approximate surface normals.

20 Claims, 7 Drawing Sheets

(56) References Cited

U.S. PATENT DOCUMENTS

| | | | |
|---|---|---|---|
| 8,781,221 B2 | 7/2014 | Ding et al. | |
| 8,797,328 B2 | 8/2014 | Corazza et al. | |
| 8,887,074 B2 | 11/2014 | Sheeler et al. | |
| 9,098,926 B2 | 8/2015 | Quan et al. | |
| 9,117,113 B2 | 8/2015 | Popa et al. | |
| 10,037,624 B2 | 7/2018 | Cashman et al. | |
| 2004/0236541 A1 | 11/2004 | Kramer et al. | |
| 2008/0231926 A1 | 9/2008 | Klug et al. | |
| 2009/0154796 A1* | 6/2009 | Gupta | G06K 9/00348 382/159 |
| 2009/0175540 A1* | 7/2009 | Dariush | G06K 9/00362 382/195 |
| 2009/0252423 A1* | 10/2009 | Zhu | G06K 9/00201 382/209 |
| 2009/0284529 A1* | 11/2009 | De Aguiar | G06T 13/40 345/420 |
| 2010/0053151 A1 | 3/2010 | Marti et al. | |
| 2012/0078614 A1 | 3/2012 | Galor et al. | |
| 2012/0113140 A1 | 5/2012 | Hilliges et al. | |
| 2012/0117514 A1 | 5/2012 | Kim et al. | |
| 2012/0212509 A1 | 8/2012 | Benko et al. | |
| 2012/0218262 A1 | 8/2012 | Yomdin et al. | |
| 2012/0327089 A1 | 12/2012 | Lee et al. | |
| 2013/0088439 A1 | 4/2013 | Shih et al. | |
| 2013/0107003 A1 | 5/2013 | Lim et al. | |
| 2013/0129230 A1* | 5/2013 | Shotton | G06K 9/00214 382/218 |
| 2014/0072175 A1* | 3/2014 | Hasler | G06K 9/00536 382/103 |
| 2014/0088941 A1 | 3/2014 | Banerjee et al. | |
| 2014/0104274 A1 | 4/2014 | Hilliges et al. | |
| 2014/0219550 A1 | 8/2014 | Popa et al. | |
| 2014/0232631 A1 | 8/2014 | Fleischmann et al. | |
| 2015/0193975 A1 | 7/2015 | Corazza et al. | |
| 2015/0256815 A1 | 9/2015 | Grafulla-gonzalez | |
| 2017/0185141 A1 | 6/2017 | Shotton et al. | |
| 2017/0186165 A1 | 6/2017 | Taylor et al. | |
| 2017/0186226 A1 | 6/2017 | Cashman et al. | |

OTHER PUBLICATIONS

"Poser 3D Animation Software", Available at: https://my.smithmicro.com/poser-3d-animation-software.html, Oct. 8, 2015, 2 Pages.

"Final Office Action Issued in U.S. Appl. No. 14/982,568", dated Jan. 9, 2018, 31 Pages.

"Non Final Office Action Issued in U.S. Appl. No. 14/982,568", dated Jun. 27, 2017, 27 Pages.

"Final Office Action Issued in U.S. Appl. No. 14/982,911", dated Jun. 2, 2017, 8 Pages.

"Final Office Action Issued in U.S. Appl. No. 14/982,911", dated Mar. 19, 2018, 10 Pages.

"Non Final Office Action Issued in U.S. Appl. No. 14/982,911", dated Nov. 27, 2017, 9 Pages.

"Non Final Office Action Issued in U.S. Appl. No. 14/982,911", dated Feb. 8, 2017, 10 Pages.

Albrecht, et al., "Construction and Animation of Anatomically Based Human Hand Models", In Proceedings of the ACM SIGGRAPH/Eurographics symposium on Computer animation, Jul. 26, 2003, pp. 98-109.

Alexander, et al., "Proportions of Hand Segments", In International Journal of Morphology, vol. 28, Issue 3, Jan. 1, 2010, pp. 755-758.

Allen, et al., "Articulated Body Deformation from Range Scan Data", In Journal of ACM Transactions on Graphics, vol. 21, Issue 3, Jul. 23, 2002, pp. 612-619.

Athitsos, et al., "Estimating 3D hand pose from a cluttered image", In Proceedings of IEEE Computer Society Conference on Computer Vision and Pattern Recognition, Jun. 16, 2003, 8 Pages.

Bergh, et al., "Combining RGB and ToF Cameras for Real-Time 3D Hand Gesture Interaction", In IEEE Workshop on Applications of Computer Vision (WACV), Jan. 5, 2011, 7 Pages.

Bogo, et al., "Detailed Body Shape and Pose from RGB-D Sequences", In Proceedings of International Conference on Computer Vision, Oct. 25, 2015, 2 Pages.

Bray, et al., "Smart Particle Filtering for 3D Hand Tracking", In Proceedings of the Sixth IEEE International Conference on Automatic Face and Gesture Recognition, May 17, 2004, 6 Pages.

Chen, et al., "Tensor-Based Human Body Modeling", In Proceedings of the IEEE Conference on Computer Vision and Pattern Recognition, Jun. 2013, pp. 105-112.

Criminis!, et al., "Decision Forests in Computer Vision and Medical Image Analysis", In Book Decision Forests for Computer Vision and Medical Image Analysis, Springer, Feb. 7, 2013, 3 Pages.

Dipietro, et al., "A Survey of Glove-Based Systems and their Applications", In IEEE Transactions on Systems, Man, and Cybernetics, Part C: Applications and Reviews, vol. 38, Issue 4, Jul. 2008, 22 Pages.

Duan, et al., "HapticFlow: PDE-Based Mesh Editing with Haptics", In Journal of Computer Animation and Virtual Worlds, vol. 15, Issue 3-4, Jul. 2004, 8 Pages.

Erol, et al., "Vision-based Hand Pose Estimation: A review", In Proceedings of Computer Vision and Image Understanding 108, Oct. 2007, 22 Pages.

Fanello, et al., "Learning to be a Depth Camera for Close-Range Human Capture and Interaction", In Proceedings of the ACM Transactions on Graphics, vol. 33, No. 4, Jul. 27, 2014, 11 Pages.

Freifeld, et al., "Lie Bodies: A Manifold Representation of 3D Human Shape", In Proceedings of the 12th European Conference on Computer Vision, Oct. 7, 2012, pp. 1-14.

Girshick, et al., "Efficient Regression of General-Activity Human Poses from Depth Images", In Proceedings of the International Conference on Computer Vision, Nov. 6, 2011, 8 Pages.

Gorce, et al., "Model-based 3D Hand Pose Estimation from Monocular Video", In IEEE Transactions on Pattern Analysis and Machine Intelligence, vol. 33, Issue 9, Sep. 2011, 14 Pages.

Heap, et al., "Towards 3D Hand Tracking using a Deformable Model", In Proceedings of the Second International Conference on Automatic Face and Gesture Recognition, Oct. 14, 1996, 6 Pages.

Hilliges, et al., "HoloDesk: Direct 3D Interactions with a Situated See-Through Display", In Proceedings of the SIGCHI Conference on Human Factors in Computing Systems, May 5, 2012, pp. 2421-2430.

Juang, Chia-Feng, "A Hybrid of Genetic Algorithm and Particle Swarm Optimization for Recurrent Network Design", In Proceedings of the IEEE Transactions on Systems, Man, and Cybernetics—Part B: Cybernetics, vol. 34, Issue 2, Apr. 2004, 10 Pages.

Kanzow, et al., "Levenberg-Marquardt Methods with Strong Local Convergence Properties for Solving Nonlinear Equations with Convex Constraints", In Journal of Computational and Applied Mathematics, vol. 172, Issue 2, Jan. 15, 2005, pp. 375-397.

Keskin, et al., "Real Time Hand Pose Estimation using Depth Sensors", In Chapter on Consumer Depth Cameras for Computer Vision, Nov. 6, 2011, pp. 1228-1234.

Kim, et al., "Digits: Freehand 3D Interactions anywhere using a Wrist-Worn Gloveless Sensor", In Proceedings of the 25th Annual ACM Symposium on User Interface Software and Technology, Oct. 7, 2012, pp. 167-176.

Kim, "Haptic Feedback Design for a Virtual Button Along Force-Displacement Curves", In Proceedings of the 6th annual ACM symposium on User interface software and technology, Oct. 8, 2013, 6 Pages.

Krupka, et al., "Discriminative Ferns Ensemble for Hand Pose Recognition", In Proceedings of the IEEE Conference on Computer Vision and Pattern Recognition, Jun. 23, 2014, 8 Pages.

Lin, et al., "Human Hand Gesture Recognition using a Convolution Neural Network", In Proceedings of International Conference on Automation Science and Engineering, Aug. 18, 2014, pp. 1038-1043.

Loop, Charles Teorell., "Smooth Subdivision Surfaces Based on Triangles", In Master's thesis, University of Utah, Department of Mathematics, Aug. 1987, 74 Pages.

Loper, et al., "OpenDR: An Approximate Differentiable Renderer", In European Conference on Computer Vision, Jan. 1, 2014, pp. 154-169.

(56) References Cited

OTHER PUBLICATIONS

Loper, et al., "SMPL: A Skinned Multi-Person Linear Model", In Proceedings of ACM SIGGRAPH, vol. 34, Issue 6, Nov. 4, 2015, 15 Pages.
Makris, et al., "Model-Based 3D Hand Tracking with On-Line Shape Adaptation", In Proceedings of the British Machine Vision Conference, Sep. 7, 2015, 12 Pages.
Marin, et al., "Hand Gesture Recognition with Jointly Calibrated Leap Motion and Depth Sensor", In Journal of Multimedia Tools and Applications, Feb. 13, 2015, 11 Pages.
Melax, et al., "Dynamics Based 3D Skeletal Hand Tracking", In Proceedings of Graphics Interface, May 29, 2013, 8 Pages.
Mo, et al., "Real-time Hand Pose Recognition Using Low-Resolution Depth Images", In Proceedings of the IEEE Computer Society Conference on Computer Vision and Pattern Recognition, vol. 2, Jun. 17, 2006, 7 Pages.
Neumann, et al., "Capture and Statistical Modeling of Arm-Muscle Deformations", In Proceedings of Computer Graphics Forum, vol. 32, Issue 2, May 6, 2013, pp. 285-294.
Oberweger, et al., "Hands Deep in Deep Learning for Hand Pose Estimation", In Proceeding of 20th Computer Vision Winter Workshop, Feb. 9, 2015, 10 Pages.
Oberweger, "Training a Feedback Loop for Hand Pose Estimation", In Proceedings of International Conference on Computer Vision, Dec. 7, 2015, 9 Pages.
Oikonomidis, et al., "Efficient Model-Based 3D Tracking of Hand Articulations using Kinect", In Proceedings of British Machine Vision Conference, Aug. 29, 2011, pp. 1-11.
Oikonomidis, et al., "Full DOF Tracking of a Hand Interacting with an Object by Modeling Occlusions and Physical Constraints", In Proceedings of the IEEE International Conference on Computer Vision, Nov. 6, 2011, 8 Pages.
Oikonomidis, et al., "Tracking the Articulated Motion of Two Strongly Interacting Hands", In Proceedings IEEE Conference on the Computer Vision and Pattern Recognition, Jun. 16, 2012, 8 Pages.
"International Preliminary Report on Patentability Issued in PCT Application No. PCT/US2016/067641", dated Oct. 31, 2017, 10 Pages.
"International Search Report and Written Opinion Issued in PCT Application No. PCT/US2016/067641", dated Mar. 31, 2017, 12 Pages.
"Second Written Opinion Issued in PCT Application No. PCT/US2016/067641", dated Jul. 28, 2017, 4 Pages.
"International Search Report and Written Opinion Issued in PCT Application No. PCT/US2016/067643", dated Apr. 21, 2017, 11 Pages.
"Non Final Office Action Issued in U.S. Appl. No. 14/982,911", dated Aug. 13, 2018, 9 Pages.
"How to Apply Subdivision Surface for Fluent Bone Animation", Retrieved from <<https://blender.stackexchange.com/questions/8341/how-to-apply-subdivision-surface-for-fluent-bone-animation>>, Apr. 29, 2014, 3 Pages.
"Final Office Action Issued in U.S. Appl. No. 14/982,878", dated Feb. 9, 2018, 14 Pages.
"Non Final Office Action Issued in U.S. Appl. No. 14/982,878", dated Sep. 18, 2017, 14 Pages.
Agarwal, et al., "Ceres Solver", Retrieved from <<http://ceres-solver.org/>>, Oct. 7, 2015, 2 Pages.
Allen, et al., "The Space of Human Body Shapes: Reconstruction and Parameterization from Range Scans", In Journal of ACM Transactions on Graphics, vol. 22, Issue 3, Jul. 1, 2003, 8 Pages.
Anguelov, et al., "SCAPE: Shape Completion and Animation of People", In Journal of ACM Transactions on Graphics, vol. 24, Issue 3, Jul. 31, 2005, pp. 408-416.
Ballan, et al., "Motion Capture of Hands in Action using Discriminative Salient Points", In Proceedings of 12th European Conference on Computer Vision, Oct. 7, 2012, 14 Pages.

Blanz, et al., "A Morphable Model for the Synthesis of 3D Faces", In Proceedings of the 26th Annual Conference on Computer Graphics and Interactive Techniques, Jul. 1, 1999, 8 Pages.
Cashman, et al., "What Shape Are Dolphins? Building 3D Morphable Models from 2D Images", In Journal of IEEE Transactions on Pattern Analysis and Machine Intelligence, vol. 35, Issue 1, Jan. 1, 2013, pp. 232-244.
Dewaele, et al., "Hand Motion from 3D Point Trajectories and a Smooth Surface Model", In Proceedings of 8th European Conference on Computer Vision, May 1, 2004, pp. 495-507.
Hasler, et al., "A Statistical Model of Human Pose and Body Shape", In Proceedings of 30th Annual Conference of the European Association for Computer Graphics, vol. 28, No. 2, 10 Pages.
Helten, et al., "Personalization and Evaluation of a Real-time Depth-based Full Body Tracker", In Proceedings of International Conference on 3D Vision, Jun. 29, 2013, 8 Pages.
Hirshberg, et al., "Coregistration: Simultaneous Alignment and Modeling of Articulated 3D Shape", In Proceedings of 12th European Conference on Computer Vision, Oct. 7, 2012, pp 242-255.
Igarashi, et al., "As-Rigid-As-Possible Shape Manipulation", In Proceedings of ACM Transactions on Graphics, vol. 24, Issue 03, Jul. 1, 2005, pp. 1134-1141.
Izadi, et al., "KinectFusion: Real Time 3D Reconstruction and Interaction Using a Moving Depth Camera", In Proceedings of the 24th annual ACM symposium on User interface software and technology, Oct. 16, 2011, pp. 559-568.
Jacobson, et al., "Stretchable and Twistable Bones for Skeletal Shape Deformation", In Journal of ACM Transactions in Graphics, vol. 30, Issue 6, Dec. 1, 2011, 8 Pages.
Keskin, et al., "Hand Pose Estimation and Hand Shape Classification using Multilayered Randomized Decision Forests", In Proceedings of the 12th European Conference on Computer Vision, Oct. 7, 2012, 4 Pages.
Khamis, et al., "Learning an Efficient Model of Hand Shape Variation from Depth Images", In Proceedings of the IEEE Conference on Computer Vision and Pattern Recognition, Jun. 7, 2015, pp. 2540-2548.
Li, et al., "3D Self-Portraits", In Journal ACM Transactions on Graphics, vol. 32, Issue 6, Nov. 1, 2013, 9 Pages.
Li, et al., "Global Correspondence Optimization for Non-Rigid Registration of Depth Scans", In Proceedings of Computer Graphics Forum, vol. 27, Issue 5, Jul. 1, 2008, 10 Pages.
Li, et al., "Robust Single-View Geometry and Motion Reconstruction", In Journal ACM Transactions on Graphics, vol. 28, Issue 5, Dec. 17, 2009, 10 Pages.
Llao, et al., "Modeling Deformable Objects from a Single Depth Camera", In Proceedings of IEEE 12th International Conference on Computer Vision, Sep. 29, 2009, pp. 167-174.
Loop, et al., "Approximating Catmull-Clark Subdivision Surfaces with Bicubic Patches", In Journal of ACM Transactions on Graphics, vol. 27, Issue 1, Mar. 1, 2008, 11 Pages.
Newcombe, et al., "DTAM: Dense Tracking and Mapping in Real-Time", In Proceedings of IEEE International Conference on Computer Vision, Nov. 6, 2011, pp. 2320-2327.
Qian, et al., "Realtime and Robust Hand Tracking from Depth", In Proceedings of IEEE Conference on Computer Vision and Pattern Recognition, Jun. 2014, 8 Pages.
Rhee, et al., "Human Hand Modeling from Surface Anatomy", In Proceedings of the Symposium on Interactive 3D Graphics and Games, Mar. 14, 2006, 9 Pages.
Schmidt, et al., "DART: Dense Articulated Real-Time Tracking", In Journal of Autonomous Robots, vol. 39, Issue 3, Oct. 1, 2015, 9 Pages.
Sharp, et al., "Accurate, Robust and Flexible Real-time Hand Tracking", In Proceedings of the 33rd Annual ACM Conference on Human Factors in Computing Systems, Apr. 18, 2015, pp. 3633-3642.
Sorce, et al., "Model-Based Hand Tracking with Texture, Shading and Self-occlusions", In Proceedings of IEEE Conference on Computer Vision and Pattern Recognition, Jun. 23, 2008, 8 Pages.
Sorkine, et al., "As-Rigid-As-Possible Surface Modeling", In Proceedings of the Fifth Eurographics Symposium on Geometry Processing, vol. 4, Jul. 4, 2007, 8 Pages.

(56) References Cited

OTHER PUBLICATIONS

Sorkine, et al., "Laplacian Surface Editing", In Proceedings of the Eurographics/ACM SIGGRAPH Symposium on Geometry Processing, Jul. 8, 2004, 10 Pages.

Stoll, et al., "Template Deformation for Point Cloud Fitting", In Eurographics Symposium on Point-Based Graphics, Jul. 29, 2006, 9 Pages.

Straka, et al., "Simultaneous Shape and Pose Adaption of Articulated Models using Linear Optimization", In Proceedings of the 12th European conference on Computer Vision, Oct. 7, 2012, 14 Pages.

Sumner, et al., "Embedded Deformation for Shape Manipulation", In Journal of ACM Transactions on Graphics, vol. 26, Issue 3, Jul. 1, 2007, 8 Pages.

Taylor, et al., "The Vitruvian Manifold: Inferring Dense Correspondences for One-Shot Human Pose Estimation", In IEEE Conference on Computer Vision and Pattern Recognition, Jun. 16, 2012, 8 Pages.

Triggs, et al., "Bundle Adjustment—A Modern Synthesis", In Proceedings of International Workshop on Vision Algorithms: Theory and Practice, Sep. 21, 1999, pp. 1-71.

Wand, et al., "Efficient Reconstruction of Nonrigid Shape and Motion from Real-Time 3D Scanner Data", In Journal of ACM Transactions on Graphics, vol. 28, Issue 2, Apr. 1, 2009, 15 Pages.

Wang, et al., "An Adjustable Polygon Connecting Method for 3D Mesh Refinement", In Proceedings of International Conference on Virtual Reality and Visualization, Aug. 30, 2014, pp. 202-207.

Weiss, et al., "Home 3D Body Scans from Noisy Image and Range Data", In Proceedings of IEEE International Conference on Computer Vision, Nov. 6, 2011, pp. 1951-1958.

Xu, et al., "Estimate Hand Poses Efficiently from Single Depth Images", In International Journal of Computer Vision, vol. 116, Issue 1, Apr. 19, 2015, pp. 21-45.

Poier, et al., "Hybrid One-Shot 3D Hand Pose Estimation by Exploiting Uncertainties", In Proceedings of 26th British Machine Vision Conference, Oct. 27, 2015, pp. 1-14.

Ren, et al., "Depth Camera Based Hand Gesture Recognition and its Applications in Human-Computer-Interaction", In Proceedings of 8th International Conference on Information, Communications and Signal Processing, Dec. 13, 2011, 5 Pages.

Shotion, et al., "Decision Jungles: Compact and Rich Models for Classification", In Proceedings of Advances in Neural Information Processing Systems, Dec. 5, 2013, pp. 1-9.

Shotton, et al., "Real-Time Human Pose Recognition in Parts from Single Depth Images", In Proceedings of the IEEE Conference on Computer Vision and Pattern Recognition, Jun. 21, 2011, 8 Pages.

Sridhar, et al., "Fast and Robust Hand Tracking Using Detection-Guided Optimization", In Proceedings of Computer Vision and Pattern Recognition, Jun. 7, 2015, pp. 3213-3221.

Sridhar, "Interactive Markerless Articulated Hand Motion Tracking using RGB and Depth Data", In Proceedings of IEEE International Conference on Computer Vision, Dec. 3, 2013, 8 Pages.

Sridhar, et al., "Real-time Hand Tracking Using a Sum of Anisotropic Gaussians Model", In Proceedings of International Conference on 3D Vision, Dec. 8, 2014, 8 Pages.

Stenger, et al., "Model-Based 3D Tracking of an Articulated Hand", In Proceedings of IEEE Computer Society Conference on Computer Vision and Pattern Recognition, Dec. 8, 2001, 6 Pages.

Sun, et al., "Conditional Regression Forests for Human Pose Estimation", In Proceedings of IEEE Conference on Computer Vision and Pattern Recognition, Jun. 16, 2012, 8 Pages.

Supancic, et al., "Depth-based Hand Pose Estimation: Data, Methods, and Challenges", In Proceedings of International Conference Computer Vision, Nov. 30, 2015, 15 Pages.

Suryanarayan, et al., "Dynamic Hand Pose Recognition using Depth Data", In Proceedings of 20th International Conference on Pattern Recognition, Aug. 23, 2010, pp. 3105-3108.

Tagliasacchi, et al., "Robust Articulated-ICP for Real-Time Hand Tracking", In Proceedings of Eurographics Symposium on Geometry Processing, vol. 34, No. 5,, Aug. 6, 2015, 14 Pages.

Tan, et al., "Fits Like a Glove: Rapid and Reliable Hand Shape Personalization", In Proceedings of the IEEE Conference on Computer Vision and Pattern Recognition, Jun. 27, 2016, pp. 5610-5619.

Tang, et al., "Latent Regression Forest: Structured Estimation of 3D Articulated Hand Posture", In Proceedings of IEEE Conference on Computer Vision and Pattern Recognition, Jun. 9, 2014, pp. 3786-3793.

Tang, et al., "Opening the Black Box: Hierarchical Sampling Optimization for Estimating Human Hand Pose", In Proceedings of International Conference on Computer Vision, Nov. 30, 2015, 9 Pages.

Tang, et al., "Real-Time Articulated Hand Pose Estimation using Semi-Supervised Transductive Regression Forests", In Proceedings of IEEE International Conference on Computer Vision, Dec. 3, 2013, pp. 3224-3231.

Tang, Matihew, "Recognizing Hand Gestures with Microsoft's Kinect", In Palo Alto: Department of Electrical Engineering of Stanford University, Mar. 16, 2011, 12 Pages.

Taylor, et al., "User-Specific Hand Modeling from Monocular Depth Sequences", In IEEE Conference on Computer Vision and Pattern Recognition, Jun. 24, 2014, 8 Pages.

Tompson, et al., "Real-Time Continuous Pose Recovery of Human Hands Using Convolutional Networks", In Journal of ACM Transactions on Graphics, vol. 33, Issue 5, Sep. 23, 2014, 10 Pages.

Tsoli, et al., "Breathing Life into Shape: Capturing, Modeling and Animating 3D Human Breathing", In Journals of ACM Transactions on Graphics, vol. 33, Issue 4, Jul. 27, 2014, 11 Pages.

Vicente, et al., "GPU-Enabled Particle Based Optimization for Robotic-Hand Pose Estimation and Self-Calibration", In Proceedings of IEEE International Conference on Autonomous Robot Systems and Competitions, Apr. 8, 2015, pp. 3-8.

Wang, et al., "6D Hands: Markerless Hand-Tracking for Computer Aided Design", In Proceedings of the 24th Annual ACM Symposium on User Interface Software and Technology, Oct. 16, 2011, pp. 549-557.

Wang, et al., "Data-driven Glove Calibration for Hand Motion Capture", In Proceedings of the 12th ACM SIGGRAPH/ Eurographics Symposium on Computer Animation, Jul. 19, 2013, 10 Pages.

Wang, et al., "Real-Time Hand-Tracking with a Color Glove", Proceedings of ACM Transactions on Graphics, vol. 28, Issue 3, Jul. 27, 2009, 8 Pages.

Wang, et al., "Video-Based Hand Manipulation Capture through Composite Motion Control", In Proceedings of ACM Transactions on Graphics, vol. 32, Issue 4, Jul. 21, 2013, 14 Pages.

Wu, et al., "Capturing Natural Hand Articulation", In Proceedings of the 8th International Conference on Computer Vision, vol. 2, Jul. 7, 2001, pp. 426-432.

Wu, et al., "View-Independent Recognition of Hand Postures", In Proceedings of IEEE Conference on Computer Vision and Pattern Recognition, Jun. 15, 2000, 7 Pages.

Xu, et al., "Efficient Hand Pose Estimation from a Single Depth Image", In Proceedings of the IEEE International Conference on Computer Vision, Dec. 1, 2013, pp. 3456-3462.

Yu, et al., "The Haptic Feedback Design of Augmented Reality Virtual Keyboard on the Air", In Proceedings of 8th International Conference on Universal Access in Human-Computer Interaction, Jun. 22, 2014, 5 Pages.

Yuille, et al., "Vision as Bayesian Inference: Analysis by Synthesis?", In Proceedings of Trends in Cognitive Sciences, vol. 10, Issue 7, Jul. 1, 2006, 8 Pages.

Zhao, et al., "Combining Markerbased Mocap and RGB-D Camera for Acquiring High-Fidelity Hand Motion Data", In Proceedings of the ACM SIGGRAPH/Eurographics Symposium on Computer Animation, Jul. 29, 2012, pp. 33-42.

Zibreg, Christian, "Apple patent outlines virtual Mac keyboard with haptic feedback", Available at: http://www.downloadblog.com/2015/03/19/apple-patent-mac-keyboard-haptic/, Mar. 19, 2015, 6 Pages.

* cited by examiner

TRACKING RIGGED POLYGON-MESH MODELS OF ARTICULATED OBJECTS

CROSS-REFERENCE TO RELATED APPLICATION

This application is a continuation-in-part of U.S. patent application Ser. No. 14/982,878 filed on Dec. 29, 2015, and published as US20170186165, and which is incorporated herein by reference.

BACKGROUND

Articulated objects such as the human body, human hand, a laptop computer, a robot, an animal, or other articulated object, are challenging to track with high levels of accuracy and speed from captured sensor data such as video images, depth camera images and other sensor data. Tracking such articulated objects involves calculating the global position and orientation of the object as well as tracking positions and orientations of one or more joints of the articulated entity. For example, a joint where a laptop display connects to a keyboard, a finger joint of a human hand and others.

In highly compute-constrained situations, such as where tracking technology is deployed on a mobile device, such as a wearable computing device, it is challenging to accurately and efficiently implement tracking technology for tracking articulated objects.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A tracker is described which comprises a processor configured to receive captured sensor data depicting an object. The processor is configured to access a rigged polygon mesh model of the object and to compute a plurality of approximate surface normals of a smooth subdivision surface corresponding to the rigged polygon mesh. The processor is configured to compute values of pose parameters of the model by calculating an optimization to fit the model to the captured sensor data where an evaluation metric of the optimization uses the plurality of approximate surface normals.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example is constructed or utilized. The description sets forth the functions of the example and the sequence of operations for constructing and operating the example. However, the same or equivalent functions and sequences are optionally accomplished by different examples.

Apparatus which tracks the pose of an articulated object in a more efficient manner than previously possible is described. For example the articulated object is any of: a human hand, the human head and shoulders, the human body, all or part of an animal body, a laptop computer, a robot, or other articulated object. The apparatus computes pose parameter values by fitting a three-dimensional model of the articulated object to captured data in real time. The process of fitting the model to the captured data is done using an optimization process which is a gradient-based optimization and which is therefore possible to compute in a practical manner. A gradient-based optimization is a search process which searches for a minimum of an energy function in an iterative manner and by using an evaluation metric to decide which direction to search in.

Previously it has not been possible to use a gradient-based optimization, and where variables representing correspondences between the data and the model are included in the optimization jointly with the pose parameters, to fit a rigged polygon mesh model directly to captured sensor data of the articulated object, because of the discontinuities in the rigged polygon mesh model where the faces of the polygons meet. Previously the rigged polygon mesh model has been converted into a smooth subdivision surface (referred to as a limit surface) by repeatedly dividing the polygons into smaller polygons until the surface becomes smooth. The smooth subdivision surface is then used in a linear optimization process to fit the smooth subdivision surface to captured data such as depth images. However, computing the smooth subdivision surface from the rigged polygon mesh model is computationally intensive and time consuming. The technology described herein enables a rigged polygon mesh model of the articulated object to be fitted directly to captured sensor data, without the need to compute the smooth subdivision surface. As a result significant computational efficiencies are gained which is particularly beneficial where the pose tracker is deployed in a wearable computing device or other resource constrained computing device. Thus the operations improve the functioning of the computing device.

Figure 1:
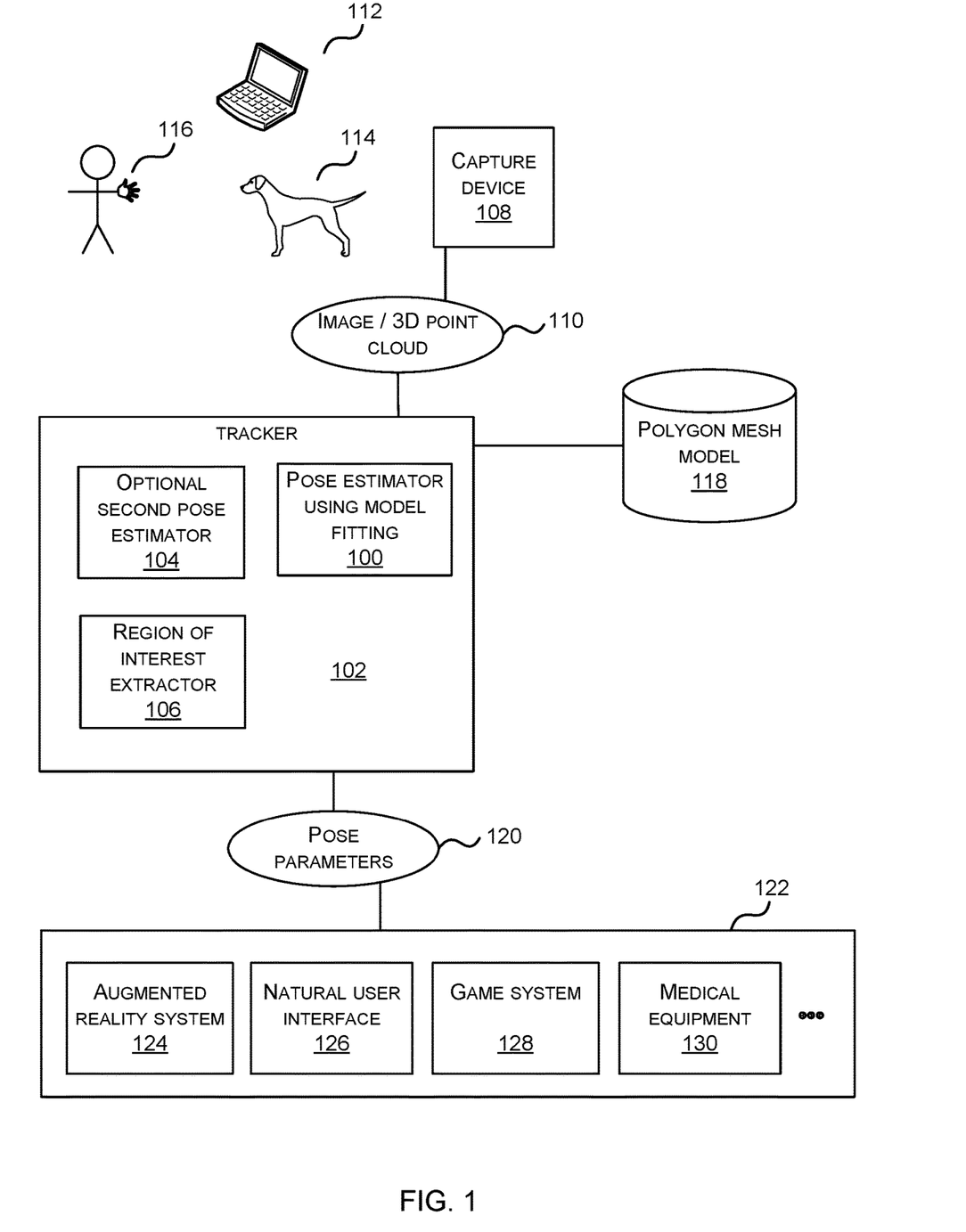
FIG. 1 is a schematic diagram of a tracker which computes pose parameters of an articulated object.

FIG. 1 is a schematic diagram of a tracker which computes pose parameters of an articulated object. The pose parameters comprise a global location and global orientation of the object as well as positions of one or more joints of the object.

A capture device 108 such as a color camera, depth camera, a sensor which captures three dimensional (3D) point clouds, or other type of sensor captures data depicting the articulated object in an environment. In the example of FIG. 1 the articulated object is shown as a human hand 116, a laptop computer 112, or a dog 114 but any other articulated object may be used. The captured data such as an image or 3D point cloud 110 is input to a tracker 102 using a wired or wireless link, over a communications network or in other ways.

The tracker 102 is computer implemented for example in a mobile phone, in a personal computer, in a head worn augmented reality computing device, in a game system, in medical equipment or in other apparatus depending on the application domain concerned. The tracker 102 has access, over a wired or wireless communications link over a network, or from a memory at the tracker itself, to a store holding a rigged polygon mesh model 118 of the object. For example, the rigged polygon mesh model 118 is stored at the mobile phone, medical equipment, game system or other device. The rigged polygon mesh model 118 is stored at a remote location accessible to the tracker 102 over a communications network, in some examples. The tracker has an input such as a wireless receiver, a wired communications port or other input to a computing device, which receives captured sensor data from the capture device 108. The capture device 108 sends the captured sensor data to the tracker over a network in some examples. The tracker receives captured sensor data from more than one capture device in some examples. The sensor data received at the tracker is stored in a memory of the tracker such as the memory described later in this document.

The tracker computes values of pose parameters 120 of the rigged polygon mesh model 118 which fit the captured data 110. The tracker is able to do this for a single instance of the captured data 110. In some examples the tracker computes a stream of values of the pose parameters 120 as a stream of captured data 110 is input to the tracker 102. In this way the tracker 102 follows pose of the articulated object as it moves and/or as the capture device 108 moves. The computed values of the pose parameters 120 are input to one or more downstream apparatus 122 such as an augmented reality system 124, a natural user interface 126, a game system 128, medical equipment 130 or others.

The tracker itself comprises a pose estimator which uses model fitting 100, an optional second pose estimator 104 using another type of tracking technology, and optionally a region of interest extractor 106.

In some examples, the functionality of the tracker 102 is performed, at least in part, by one or more hardware logic components. For example, and without limitation, illustrative types of hardware logic components that are used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 2:
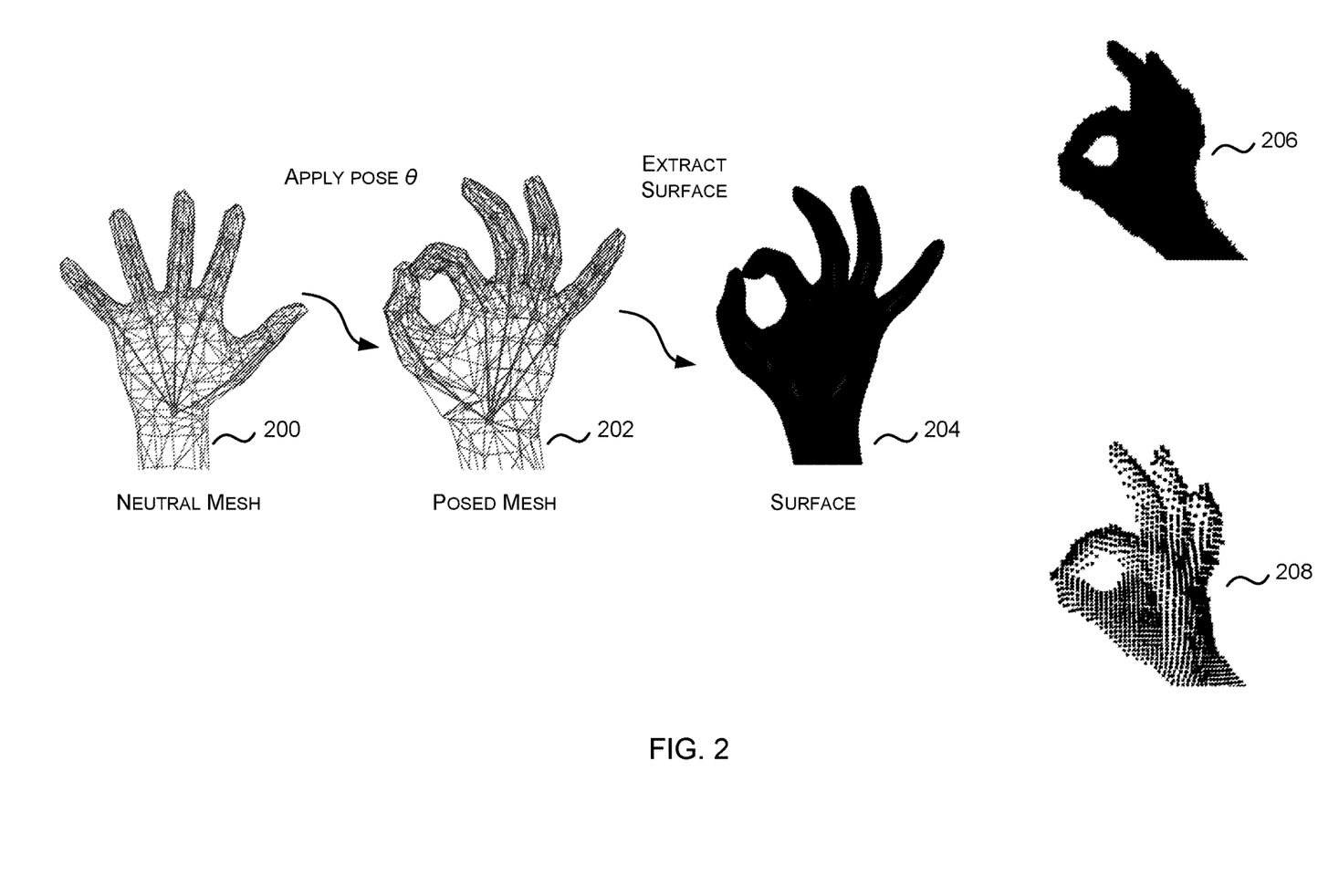
FIG. 2 is a schematic diagram of a neutral mesh model of a human hand, a posed mesh of a human hand, a smooth surface model of a human hand, a depth image and a point cloud.

FIG. 2 is a schematic diagram of a neutral mesh model 200 of a human hand, a posed mesh model 202 of a human hand, a smooth surface model 204 of a human hand, a depth image 206 and a point cloud 208. This example of a mesh model 200, 202 is shown to illustrate the difference between a mesh model 200, 202 and a smooth-surface model 204.

In the example of FIG. 2 the neutral mesh model 200 of a human hand is a triangular mesh which is rigged as it contains a representation of a skeleton. When values of the pose parameters, such as joint positions, of the skeleton are applied to the neutral mesh model 200 a posed mesh model such as 202 is obtained. A smooth surface may be computed from a mesh model, such as the posed mesh model 202 to obtain smooth surface 204. A smooth surface may be computed by repeatedly subdividing the faces of the mesh model until in the limit, a smooth surface is obtained, referred to as the limit surface corresponding to the polygon "control" mesh. Other ways of computing a smooth surface are available. For example, closed-form solutions may be used to evaluate a point on the limit surface or a closely related approximation so that in practice it is not essential to subdivide the faces of the mesh model infinitely. However, computing a smooth subdivision surface from a rigged polygon mesh is computationally expensive. The present technology enables pose tracking without the need to compute smooth sub-division surfaces so that efficiencies are gained.

FIG. 2 shows a depth image of a human hand to illustrate the situation where the captured data 110 comprises a depth image. A depth image is a two dimensional (2D) array where each entry comprises a distance value which is a distance from the camera to a surface in the scene depicted in the depth image. A point cloud is an array where each entry comprises a three dimensional (3D) coordinate of a surface point in the scene depicted in the image. The depth image is back-projected to compute a 3D point cloud 208 using knowledge of the camera. In some examples the 3D point cloud is captured by a scanning sensor rather than by back projecting from a depth image.

Figure 3:
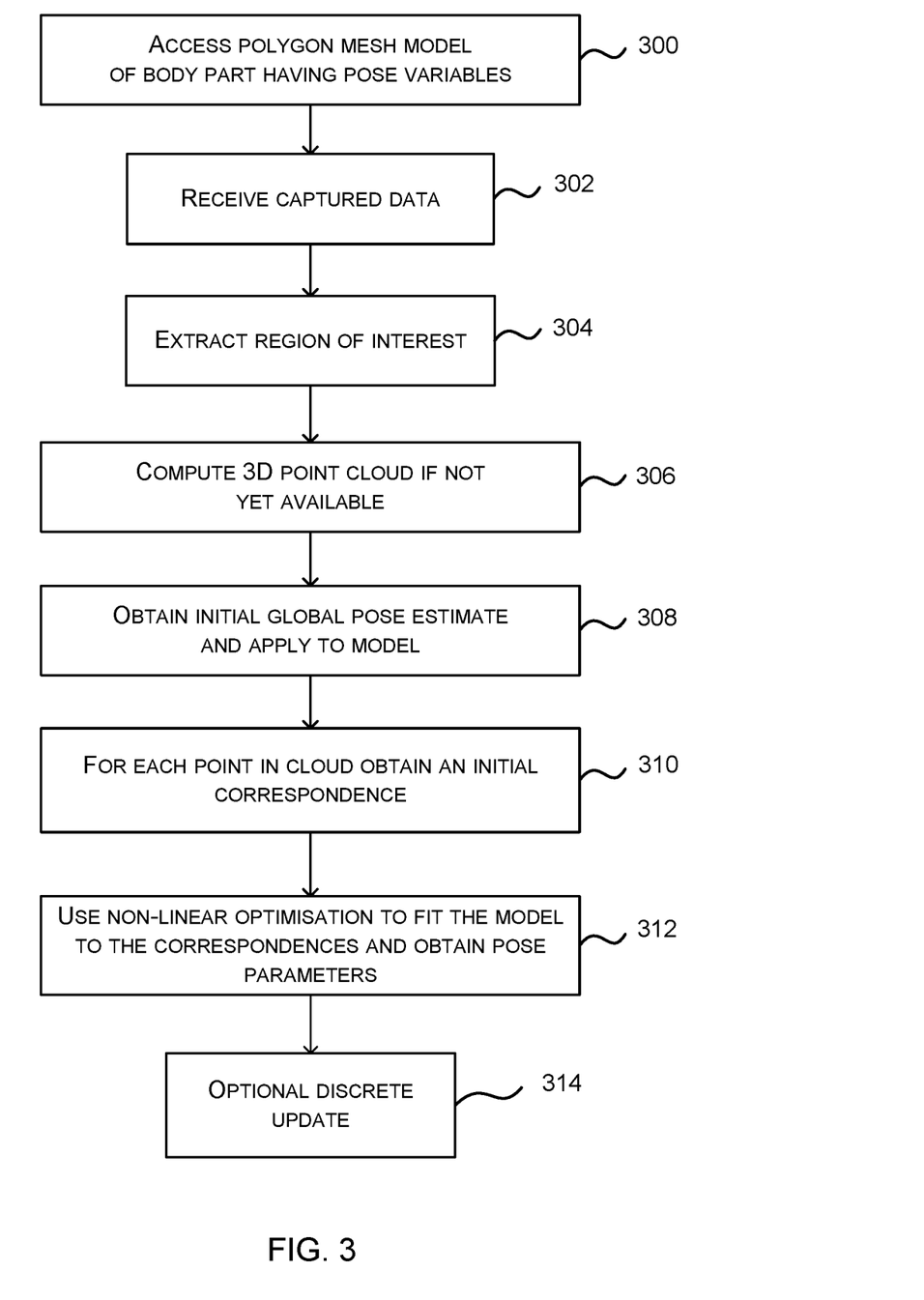
FIG. 3 is a flow diagram of an example method of operation at the tracker of FIG. 1.

FIG. 3 is a flow diagram of an example method of operation at the tracker of FIG. 1. The tracker accesses 300 the rigged polygon mesh model of the articulated object. For example, in the case that the aim is to track a laptop computer the tracker accesses 300 a rigged polygon mesh model of a generic laptop.

The tracker receives captured data 302 depicting the object to be tracked. For example, the captured data 302 is a 3D point cloud, a depth map, one or more frames of raw time of flight data, color image data or other captured data depicting the object to be tracked. Optionally the tracker extracts 304 a region of interest from the captured data where the region of interest depicts the object to be tracked rather than other parts of the scene or environment in which the object is present. For example, the tracker uses machine learning technology or image analysis to extract a region of interest of the captured data depicting the object to be tracked. The region of interest may or may not be contiguous.

In some examples, where the region of interest comprises parts of a depth map, the tracker computes 306 a 3D point cloud by back projecting the region of interest. In some cases a 3D point cloud is already available. In some cases no 3D point cloud is used.

Optionally the tracker obtains 308 an initial pose estimate and applies it to the model. For example, by using a value of the pose computed for a previous instance of the captured data 110. For example, by recording a series of values of the pose computed by the tracker and extrapolating the series to compute a predicted future value of the pose. For example, by selecting a value of the pose at random. For example, by selecting a value of the pose using output of a machine learning algorithm.

Optionally the tracker obtains 310 initial correspondence estimates. A correspondence estimate is an indication of a 3D point on the surface of the model corresponding to a captured data point.

In some examples a correspondence is a tuple of values denoted by the symbol u in this document, which specifies a point on a surface referred to herein as a Phong surface, which is an approximation to a smooth surface derived from the rigged polygon mesh but without the need for computing a limit surface. A defining function S is stored at the tracker in some examples and is a function which takes as its input a correspondence u and the pose parameters θ. The defining function S computes a 3D position in the world that point u on the Phong surface corresponds to. In an example, polygon indices are stored on disk, and the defining function S which is implemented in code, is also stored on disk. The defining function S uses the polygon indices alongside the mesh posing implementation to evaluate the surface by interpolating between the vertices given by the polygon indices.

The tracker obtains 310 a plurality of initial correspondence estimates, for example, one for each point in the point cloud, or one for each of a plurality of captured data points. The tracker obtains 310 the initial correspondence estimates by selecting them at random or by using machine learning, or by choosing a closest point on the model given the initial estimate of the global pose, using combinations of one or more of these approaches, or in other ways. In the case that machine learning is used a machine learning system has been trained using a large amount of training data to derive a direct transformation from image data to 3D model points.

The tracker computes an optimization 312 to fit the model to the captured data. For example, the tracker computes the following minimization beginning from the initial values of the correspondence estimates and the pose parameters where these are available (or beginning from randomly selected values)

$$\min_{\theta, u_1, \ldots, u_n} \sum_{i=1}^{n} \psi(\| x_i - S(u_i; \theta) \|) + \psi^T(\| x_i^T - S^T(u_i; \theta) \|)$$

Which is expressed in words as a minimum over the pose parameters θ and n values of the correspondences u of the sum of a robust kernel ψ(•) applied to the magnitude of the difference between a 3D point cloud point $x_i$ and a corresponding 3D surface point $S(u_i; \theta)$, and a different robust kernel $\psi^T(\bullet)$ applied to the magnitude of the difference between a 3D point cloud normal $x_i^T$ and a corresponding 3D surface normal $S^T(u_i; \theta)$. The 3D surface point in this equation lies on a rigged polygon mesh, while the 3D surface normal is an approximation to the geometric normal of a smooth surface such as a subdivision surface. The surface, referred to herein as a Phong surface, is not computed in its entirety; rather particular parts of the Phong surface are computed as and when needed. The corresponding 3D surface points given by $S(u_i; \theta)$, and the corresponding 3D surface normals $S^T(u_i; \theta)$ are efficient to compute in the approximate (Phong) surface case. The 3D Phong surface normal is computed by computing approximate surface normals along it as described in detail with reference to FIGS. 4 to 6. Where the robust kernels ψ(•) and $\psi^T(\bullet)$ are a Geman-McClure kernel, a Huber kernel, a Quadratic kernel or other kernel.

The optimization enables correspondence estimation and model fitting to be unified since the minimization searches over possible values of the correspondences u and over possible values of the pose parameters θ. This is found to give better results than an alternative approach of using alternating stages of model fitting and correspondence estimation.

The optimization is non-linear in some examples. The result of the optimization is a set of values of the pose parameters θ including the global pose parameters and the joint positions.

Because the model has a continuous normal approximation it is possible to compute the optimization using a non-linear optimization process. For example, a gradient-based process which exploits the fact that rate of change of both surface position and surface orientation does not change substantially across edges in a good approximation to a smooth surface, such as the Phong surface. Jacobian optimization methods are used in some examples. This improves speed of processing. It is expected that such an approach (using a rigged polygon mesh model and a non-linear optimization that unifies correspondence estimation and model fitting) would not work and/or would give inaccurate results. Despite this it has unexpectedly been found that the methods described herein enable accurate results to be obtained whilst giving processing efficiencies.

A discrete update operation is optionally used together with the optimization. This involves using the continuous optimization as mentioned above to update both the pose and the correspondences together, and then using a discrete update to re-set the values of the correspondences using the captured sensor data. The discrete update allows the correspondences to jump efficiently from one part of the object surface to another, for example, from one finger-tip to the next.

The process of FIG. 3 is optionally repeated, for example as new captured data arrives as part of a stream of captured data. In some examples the process of FIG. 3 is arranged to include reinitialization whereby the pose parameters used at the beginning of the optimization are obtained from another source such as the second pose estimator 104. For example, using global positioning sensor data, using another tracker which is independent of the tracker of FIG. 1, using random values or in other ways. Reinitialization occurs according to various criteria such as at specified time intervals, at specified intervals of instances of captured data, according to user input, according to error metrics which indicate error in the pose values or in other ways. Reinitialization using an independent tracker is found to give good results.

Figure 4:
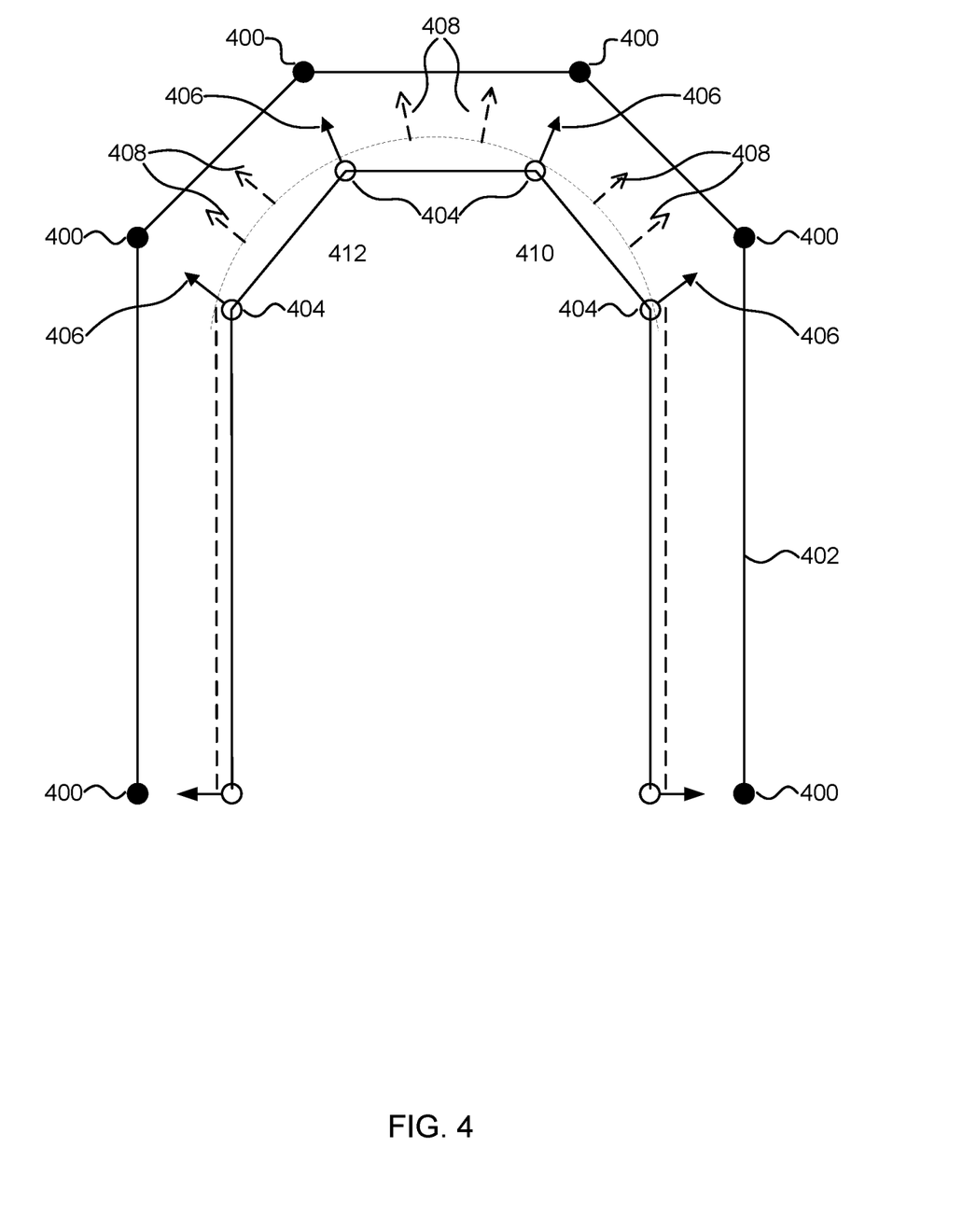
FIG. 4 is a schematic diagram of a cross section through part of a rigged polygon mesh model.

FIG. 4 is a schematic diagram of a cross section through a rigged polygon mesh 402 of a finger. Vertices 400 of the rigged polygon mesh are visible but note that FIG. 4 is a cross section and in practice the rigged polygon mesh is a three dimensional structure. The rigged polygon mesh is related to an approximation to a smooth surface referred to herein as a Phong surface 410.

From the rigged polygon mesh a plurality of approximate surface normals 408 of the Phong surface are computed and these are used in the evaluation metric of the optimization. The approximate surface normals 408 are approximate because they are not necessarily perpendicular to a tangent of the Phong surface.

To compute the Phong control vertices 404, individual ones of the vertices 400 of the rigged polygon mesh 402 are projected onto a limit subdivision surface 412 of the rigged polygon mesh 402. (Note that in FIG. 4 the limit surface of the rigged polygon mesh 402 is not shown.) Each vertex 400 of the original rigged polygon mesh 402 is projected onto one point of the limit surface and this point is referred to as a control vertex herein. In FIG. 4 the control vertices are labelled with the reference numeral 404. The projection is computed without the need to compute the full limit surface of the rigged polygon mesh 402. The projection is computed by a linear interpolation given by the definition of Loop subdivision or other definitions of the Phong surface control vertices and normal such as reading those values directly from disk.

At each control vertex, a surface normal is computed with respect to the limit surface and is referred to herein as a control surface normal 406. The control surface normals 406 are computed without the need to compute the full limit surface of the rigged polygon mesh 402. The control vertices 404 are vertices of a control mesh of the Phong surface 410, referred to herein as a Phong surface control mesh. The control vertices 404 and the control surface normals 406 are used to compute the approximate surface normals 408 of the Phong surface 410 by interpolation. Any suitable type of interpolation method is used such as linear interpolation.

Once the approximate surface normals of the Phong surface are available, in a desired region of the Phong surface, the gradient-based optimization is able to proceed by searching for a fit between the observed data and the Phong surface.

Figure 5:
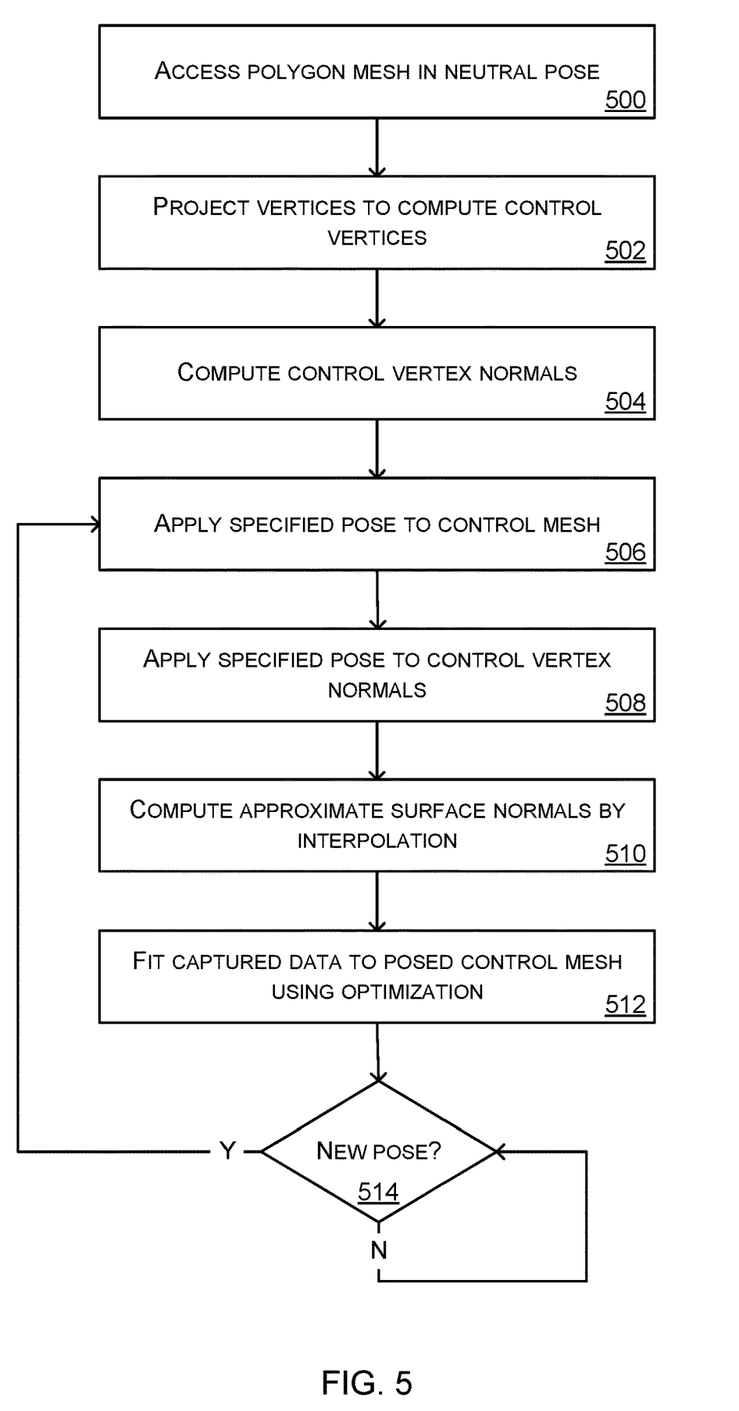
FIG. 5 is a flow diagram of a method of fitting captured sensor data to a rigged polygon mesh model.

An example of a method used by the tracker is given with reference to FIG. 5. The tracker accesses 500 a rigged polygon mesh model of the object to be tracked in a neutral pose from a memory at the tracker or elsewhere. The tracker projects 502 vertices of the rigged polygon mesh onto a limit surface of the rigged polygon mesh to compute control vertices. The projection is done without the need to compute the full limit surface of the rigged polygon mesh. The tracker computes, from the control vertices, a Phong surface control mesh which is the rigged polygon mesh formed from the control vertices. The tracker also computes 504 control vertex normals which are surface normals of the limit surface at the control vertices.

The tracker receives a specified pose (such as a previous value of the pose from a previous frame) and applies 506 the specified pose to the Phong surface control mesh. The tracker also applies 508 the specified pose to the control vertex normals. The tracker then computes 510 approximate surface normals of the Phong surface by interpolating using the control vertex normals and the control vertices.

The tracker proceeds to fit 512 the posed Phong surface to the captured data. This is done using a gradient-based optimization where the evaluation metric of the optimization uses the approximate surface normals of the Phong surface.

A decision is made as to whether a new pose is likely at check 514. This check is to decide whether the object being tracked is likely to be in a new pose. The check is made by examining how much time has gone by since the last pose was computed or by examining how many new frames of captured sensor data have arrived since the last pose was computed. If a new pose is likely or detected at check 514 the method of FIG. 5 repeats from operation 506. A benefit of repeating from operation 506 is that the operations 502 and 504 are not repeated. Since these operations are relatively computationally expensive compared with other operations of the method of FIG. 5, efficiencies are gained.

In cases where the object being tracked is rigid or does not deform, the method of FIG. 5 gives highly accurate results. Where the object deforms the method of FIG. 5 diverges from the best available approximation to a posed smooth surface model due to the control vertices and control vertex normals not being correct projections for parts of the object which deform. However, in practice, good working results are obtained using the method of FIG. 5.

Figure 6:
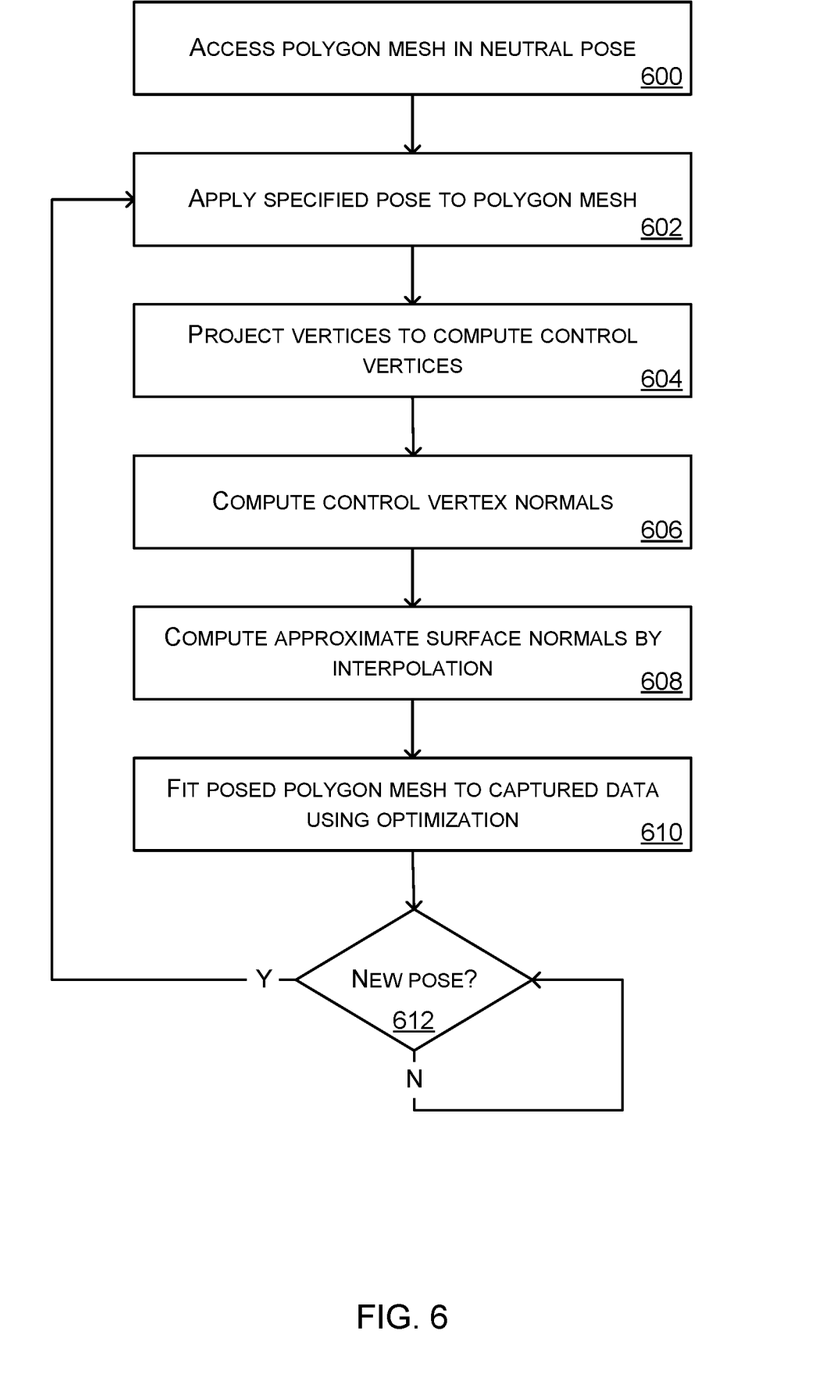
FIG. 6 is a flow diagram of another method of fitting captured sensor data to a rigged polygon mesh model.

Another example of a method executed by the tracker is given with reference to FIG. 6. The tracker accesses 600 a rigged polygon mesh model of the object to be tracked in a neutral pose from a memory at the tracker or elsewhere. The tracker receives a specified pose (such as a previous value of the pose from a previous frame) and applies 602 the specified pose to the rigged polygon mesh using linear blend skinning or any other suitable algorithm for posing a rigged polygon mesh.

The tracker projects 604 vertices of the rigged polygon mesh onto a limit surface of the rigged polygon mesh to compute control vertices. The projection is done without the need to compute the full limit surface of the rigged polygon mesh. The tracker computes, from the control vertices, a Phong surface control mesh which is the rigged polygon mesh formed from the control vertices. The tracker also computes 606 control vertex normals which are surface normals of the limit surface at the control vertices.

The tracker then computes 608 approximate surface normals of the Phong surface by interpolating using the control vertex normals and the control vertices.

The tracker proceeds to fit 610 the posed rigged polygon mesh of operation 602 to the captured data. This is done using a gradient-based optimization where the evaluation metric of the optimization uses the approximate surface normals of the Phong surface.

Figure 7:
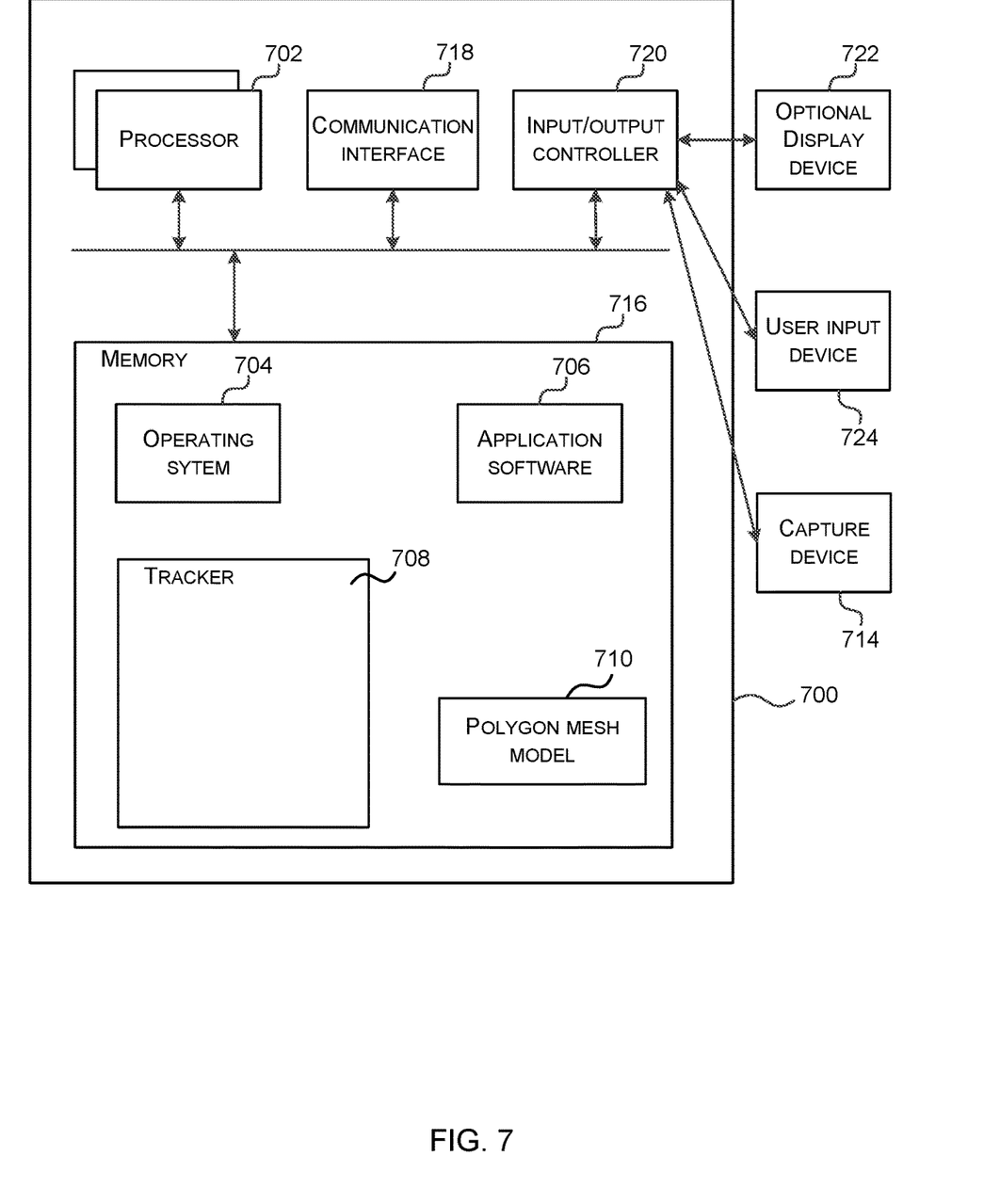
FIG. 7 illustrates an exemplary computing-based device in which embodiments of an articulated object tracker are implemented.

A decision is made as to whether a new pose is likely at check 612. This check is to decide whether the object being tracked is likely to be in a new pose. The check is made by examining how much time has gone by since the last pose was computed or by examining how many new frames of captured sensor data have arrived since the last pose was computed. If a new pose is likely or detected at check 612 the method of FIG. 6 repeats from operation 602. A benefit of repeating from operation 602 is that the control vertices and control vertex normals are highly accurate because they are computed from the posed rigged polygon mesh from operation 602. As compared with the method of FIG. 5 there is more computation involved, since the computation of the control vertices and control vertex normals in operations 604 and 606 occurs at each iteration of the method. FIG. 7 illustrates various components of an exemplary computing-based device 700 which is implemented as any form of a computing and/or electronic device, and in which embodiments of a tracker such as tracker 102 of FIG. 1 is implemented.

Computing-based device 700 comprises one or more processors 702 which are microprocessors, controllers or any other suitable type of processors for processing computer executable instructions to control the operation of the device in order to compute values of pose parameters, including global pose parameters and joint positions, of articulated objects. In some examples, for example where a system on a chip architecture is used, the processors 702 include one or more fixed function blocks (also referred to as accelerators) which implement a part of the method of computing values of pose parameters in hardware (rather than software or firmware). Platform software comprising an operating system 704 or any other suitable platform software is provided at the computing-based device to enable application software 706 to be executed on the device.

The computer executable instructions are provided using any computer-readable media that is accessible by computing based device 700. Computer-readable media includes, for example, computer storage media such as memory 716 and communications media. Computer storage media, such as memory 716, includes volatile and non-volatile, removable and non-removable media implemented in any method or technology for storage of information such as computer readable instructions, data structures, program modules or the like. Computer storage media includes, but is not limited to, random access memory (RAM), read-only memory (ROM), erasable programmable read only memory (EPROM), electrically erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is usable to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 716) is shown within the computing-based device 700 it will be appreciated that the storage is optionally distributed or located remotely and accessed via a network or other communication link (e.g. using communication interface 718).

The computing-based device 700 also comprises an input/output controller 720 arranged to output display information to a display device 722 which is separate from or integral to the computing-based device 700. The display information provides a graphical user interface for example, to display a representation of the tracked object. The input/output controller 720 comprises an input configured to receive and process input from one or more devices, such as a user input device 724 (e.g. a mouse, keyboard, camera, microphone or other sensor) display device 722 and capture device 714. The input is any type of input able to receive sensor data from the capture device 714 such as a wired communications port, a wireless communications receiver, a digital versatile disc drive, a universal serial bus (USB) port, or other input. In some examples the user input device 724 detects voice input, user gestures or other user actions and provides a natural user interface (NUI). This user input is used to trigger operation of the tracker, to input rigged polygon mesh models, to view results and for other reasons. In an embodiment the display device 722 also acts as the user input device 724 if it is a touch sensitive display device. The input/output controller 720 also outputs data to devices other than the display device, e.g. a locally connected printing device.

Any of the input/output controller 720, display device 722 and the user input device 724 comprise NUI technology which enables a user to interact with the computing-based device in a natural manner, free from artificial constraints imposed by input devices such as mice, keyboards, remote controls and the like. Examples of NUI technology that are optionally provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, red green blue (rgb) camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (electro encephalogram (EEG) and related methods).

Alternatively or in addition to the other examples described herein, examples include any combination of the following:

A tracker comprising:

a processor configured to receive captured sensor data depicting an object; and the processor configured to access a rigged polygon mesh model of the object;

the processor configured to compute a plurality of approximate surface normals; and the processor configured to compute values of pose parameters of the model by calculating an optimization to fit the model to the captured sensor data, where an evaluation metric of the optimization uses the plurality of approximate surface normals.

The tracker described above where the processor is configured to compute the plurality of control vertices by, for each of a plurality of the vertices of the rigged polygon mesh, projecting the vertex onto a subdivision surface corresponding to the rigged polygon mesh to compute a plurality of control vertices on the limit surface.

The tracker described above where the processor is configured to compute, for each control vertex, a control vertex normal of the control vertex with respect to a same limit surface.

The tracker described above where the processor is configured to compute the approximate surface normals as interpolated values, interpolated between the control vertex normals.

The tracker described above where the processor is configured to access the rigged polygon mesh in a neutral pose, and is configured to apply a specified pose to the rigged polygon mesh and then to apply the specified pose to the control vertex normals before the interpolation is computed.

The tracker described above where the processor is configured to access the rigged polygon mesh in a neutral pose, and is configured to apply a specified pose to the rigged polygon mesh before the control vertices and the control vertex normals are computed.

The tracker described above where the processor is configured to use a gradient-based optimization process to calculate the optimization.

The tracker described above where the pose parameters comprise global pose parameters and one or more joint positions.

The tracker described above where the captured sensor data comprises a depth image and the processor is configured to back project the depth image to compute a three dimensional point cloud.

The tracker described above where the processor is arranged to extract a region of interest from the captured sensor data, and to use the region of interest and not the rest of the captured sensor data during the optimization.

The tracker described above where the processor is arranged to obtain initial values of global pose parameters which are part of the pose parameters, either from a trained machine learning system or from previous values of the pose parameters, and to begin the optimization using the initial values of the global pose parameters.

The tracker described above which is arranged to repeatedly compute the optimization for instances of the captured sensor data, and to reinitialize the optimization using data from another source.

The tracker described above which is arranged to reinitialize the optimization using data from an independent tracker.

The tracker described above where the processor is arranged to obtain initial values of the variables representing correspondences from a trained machine learning system and to begin the optimization using the initial values.

The tracker described above where the processor is arranged to obtain initial values of the variables representing correspondences by choosing, for individual points of the captured sensor data, a closest point on the model, and to begin the optimization using the initial values.

The tracker described above where the processor is arranged to obtain initial values of the variables representing correspondences by random selection and to begin the optimization using the initial values.

The tracker described above where the tracker comprises a defining function which generates a three dimensional world point corresponding to a value of a correspondence variable.

A tracker comprising:

a processor configured to receive captured sensor data depicting an object; and the processor configured to access a rigged polygon mesh model of the object in a neutral pose and to apply a specified pose to the rigged polygon mesh model;

the processor configured to compute control vertices projected from vertices of the rigged polygon mesh model in the specified pose and to compute a plurality of approximate surface normals of a limit surface of the rigged polygon mesh by interpolating between the control vertex normals; and the processor configured to compute values of pose parameters of the model by calculating an optimization to fit the model to the captured sensor data, where the optimization uses an evaluation function based on the plurality of approximate surface normals.

A computer-implemented method comprising:

receiving captured sensor data depicting an object;

accessing a rigged polygon mesh model of the object; and computing, at a processor, a plurality of approximate surface normals of a limit surface of the rigged polygon mesh; and computing, at the processor, values of pose parameters of the model by calculating an optimization to fit the model to the captured sensor data, where an evaluation metric of the optimization uses the plurality of approximate surface normals.

The method described above comprising, for individual ones of the vertices of the rigged polygon mesh, projecting the vertex onto a limit surface of the rigged polygon mesh to compute a plurality of control vertices on the limit surface.

The method described above comprising, for individual control vertices, computing a control vertex normal of the control vertex with respect to the limit surface.

The method described above comprising computing the approximate surface normals as interpolated values, interpolated between the control vertex normals and control vertices.

The method described above comprising accessing the rigged polygon mesh in a neutral pose and applying a specified pose to the rigged polygon mesh and then applying the specified pose to the control vertex normals before the interpolation is computed.

The method described above where the processor is configured to access the rigged polygon mesh in a neutral pose, and is configured to apply a specified pose to the rigged polygon mesh before the control vertices and the control vertex normals are computed.

The term 'computer' or 'computing-based device' is used herein to refer to any device with processing capability such that it is able to execute instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants and many other devices.

The methods described herein are optionally performed by software in machine readable form on a tangible storage medium e.g. in the form of a computer program comprising computer program code means adapted to perform all the operations of any of the methods described herein when the program is run on a computer and where the computer program is embodied on a computer readable medium. Examples of tangible storage media include computer storage devices comprising computer-readable media such as disks, thumb drives, memory etc. and do not include propagated signals. The software is suitable for execution on a parallel processor or a serial processor such that the method operations are carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are distributed across a network in some examples. For example, a remote computer stores an example of the process described as software. A local or terminal computer is able to access the remote computer and download a part or all of the software to run the program. Alternatively, the local computer is able to download pieces of the software as needed, or execute some software instructions at the local terminal and some at the remote computer (or computer network). Those skilled in the art will also realize that by utilizing conventional techniques known to those skilled in the art that all, or a portion of the software instructions are optionally carried out by a dedicated circuit, such as a digital signal processor (DSP), programmable logic array, or the like.

Any range or device value given herein is optionally extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above relate to one embodiment or relate to several embodiments. The embodiments are not limited to those that solve any or all of the stated problems or those that have any or all of the stated benefits and advantages. It will further be understood that reference to 'an' item refers to one or more of those items.

The operations of the methods described herein are carried out in any suitable order, or simultaneously where appropriate. Additionally, individual blocks are optionally deleted from any of the methods without departing from the spirit and scope of the subject matter described herein. Aspects of any of the examples described above are combinable with aspects of any of the other examples described to form further examples without losing the effect sought.

The term 'comprising' is used herein to mean including the method blocks or elements identified, but that such blocks or elements do not comprise an exclusive list and a method or apparatus optionally contains additional blocks or elements.

It will be understood that the above description is given by way of example only and that various modifications are optionally made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A tracker comprising:
a processor configured to receive captured sensor data depicting an object;
the processor configured to access a rigged polygon mesh model of the object;
the processor configured to compute a plurality of approximate surface normals; and
the processor configured to compute a plurality of control vertices of the rigged polygon mesh model by, for each of the plurality of the control vertices, projecting a vertex onto a limit surface corresponding to the rigged polygon mesh model to compute the plurality of control vertices on the limit surface.

2. The tracker of claim 1 where the processor is configured to compute values of pose parameters of the rigged polygon mesh model by calculating an optimization to fit the rigged polygon mesh model to the captured sensor data, where an evaluation metric of the optimization uses the plurality of approximate surface normal.

3. The tracker of claim 2 where the processor is configured to compute, for each control vertex, a control vertex normal of the control vertex with respect to the limit surface.

4. The tracker of claim 3 where the processor is configured to compute the approximate surface normals as interpolated values, interpolated between the control vertex normals.

5. The tracker of claim 4 where the processor is configured to access the rigged polygon mesh model in a neutral pose, and is configured to apply a specified pose to the rigged polygon mesh model and then to apply the specified pose to the control vertex normals before the interpolation is computed.

6. The tracker of claim 4 where the processor is configured to access the rigged polygon mesh model in a neutral pose, and is configured to apply a specified pose to the rigged polygon mesh before the control vertices and the control vertex normals are computed.

7. The tracker of claim 2 where the processor is configured to use a gradient-based optimization process to calculate the optimization.

8. The tracker of claim 2 where the pose parameters comprise global pose parameters and one or more joint positions.

9. The tracker of claim 1 where the captured sensor data comprises a depth image and the processor is configured to back project the depth image to compute a three dimensional point cloud.

10. The tracker of claim 2 where the processor is arranged to extract a region of interest from the captured sensor data, and to use the region of interest and not the rest of the captured sensor data during the optimization.

11. The tracker of claim 2 where the processor is arranged to obtain initial values of global pose parameters which are part of the pose parameters, either from a trained machine learning system or from previous values of the pose parameters, and to begin the optimization using the initial values of the global pose parameters.

12. The tracker of claim 2 which is arranged to repeatedly compute the optimization for instances of the captured sensor data, and to reinitialize the optimization using data from another source.

13. The tracker of claim 12 which is arranged to reinitialize the optimization using data from an independent tracker.

14. The tracker of claim 2 which is configured to send the computed values of the pose parameters to any one or more of: an augmented reality system, a natural user interface, a game system, medical equipment.

15. A tracker comprising:
a processor configured to receive captured sensor data depicting an object; and
the processor configured to access a rigged polygon mesh model of the object in a neutral pose and to apply a specified pose to the rigged polygon mesh model;
the processor configured to compute control vertices projected from vertices of the rigged polygon mesh model in the specified pose and to compute a plurality of approximate surface normals of a limit surface of the rigged polygon mesh by interpolating between the control vertex normals; and
the processor configured to compute values of pose parameters of the model by calculating an optimization to fit the model to the captured sensor data, where the optimization uses an evaluation function based on the plurality of approximate surface normals.

16. A computer-implemented method comprising:
receiving captured sensor data depicting an object;
accessing a rigged polygon mesh model of the object; and
computing, at a processor, a plurality of approximate surface normals of a limit surface of the rigged polygon mesh model; and
for individual ones of vertices of the rigged polygon mesh model, projecting a vertex onto the limit surface of the rigged polygon mesh model to compute a plurality of control vertices on the limit surface.

17. The method of claim 16 comprising, computing, at the processor, values of pose parameters of the rigged polygon mesh model by calculating an optimization to fit the rigged polygon mesh model to the captured sensor data, where an evaluation metric of optimization uses the plurality of approximate surface normals.

18. The method of claim 17 comprising, for individual control vertices, computing a control vertex normal of the control vertex with respect to the limit surface.

19. The method of claim 18 comprising computing the approximate surface normals as interpolated values, interpolated between the control vertex normals and control vertices.

20. The method of claim 19 comprising accessing the rigged polygon mesh model in a neutral pose and applying a specified pose to the rigged polygon mesh model and then applying the specified pose to the control vertex normals before the interpolation is computed.

* * * * *